United States Patent
Otani et al.

(10) Patent No.: US 6,439,782 B1
(45) Date of Patent: Aug. 27, 2002

(54) OPTICAL FIBER FUSION SPLICE METHOD AND OPTICAL FIBER FUSION SPLICER USED FOR THE SAME

(75) Inventors: Taku Otani; Akito Ishiguro; Kenji Takahashi; Noriyuki Kawanishi; Junichi Suzuki; Shounosuke Yaguchi, all of Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 09/510,373

(22) Filed: Feb. 22, 2000

(30) Foreign Application Priority Data

Feb. 25, 1999 (JP) .............................. 11-047811

(51) Int. Cl.[7] .............................................. G02B 6/255
(52) U.S. Cl. ....................................................... 385/96
(58) Field of Search ........................... 385/31–34, 49, 385/80–93, 95–99; 65/385; 219/383

(56) References Cited

U.S. PATENT DOCUMENTS

| | | | | |
|---|---|---|---|---|
| 5,122,638 A | * | 6/1992 | Sato et al. | 385/95 |
| 5,228,102 A | * | 7/1993 | Sato et al. | 385/95 |
| 5,561,728 A | * | 10/1996 | Kobayashi et al. | 385/97 |
| 6,130,972 A | * | 10/2000 | Shiraishi et al. | 385/33 |

* cited by examiner

*Primary Examiner*—Akm E. Ullah
(74) *Attorney, Agent, or Firm*—Burns, Doane, Swecker & Mathis LLP (57) ABSTRACT

The object of the present invention is to provide an optical fiber fusion splice method in which two optical fibers having different mode field diameters are fusion spliced with a low splice loss without complicated words and special equipment other than a fusion splice device, and an optical fiber fusion splicer which is suitably used for the optical fiber fusion method; in order to achieve the object, the present invention provides an optical fiber fusion splice method for splicing two optical fibers having different mode field diameters comprising the steps of: arranging a first optical fiber having a small mode field diameter and a second optical fiber having a large mode field diameter so that the cut surfaces thereof face each other, heating by an electric discharge and fusion splicing the cut surfaces, shifting the heating position by an electric discharge in the first optical fiber by shifting integrally the first and second optical fibers in the longitudinal direction of the optical fibers, and additional heating the first optical fiber by an electric discharge.

5 Claims, 6 Drawing Sheets

11: CORE PART   12: CLAD PART

OPTICAL FIBER FUSION SPLICE METHOD AND OPTICAL FIBER FUSION SPLICER USED FOR THE SAME

BACKGROUND OF THE INVENTION

1. Field of the Invention

The present invention relates to an optical fiber fusion splice method in which two optical fibers each having a different mode field diameter are fusion spliced by heating using an electric discharge, and an optical fiber fusion splicer which is suitably used for the optical fiber fusion splice method.

This application is based on the Japanese Patent Applications Nos. Hei 10-271633 and Hei 11-47811, the contents of which are incorporated herein by reference.

2. Description of the Related Art

When a communication cable network is formed or a device comprising optical fibers is manufactured, two optical fibers having different mode field diameters are often fusion spliced. When the two optical fibers are simply fusion spliced using an arc discharge fusion splicer, a large splice loss results, compared with a splice between two optical fibers having the same mode field diameter.

Therefore, in order to splice optical fibers having different mode field diameters with a low splice loss, the following two splice methods have been used.

As the first splice method, a splice method has been used in which a vicinity of one end of the optical fiber having a small mode field diameter is heated using a micro-torch etc., thereby dopants contained in the core near to the end diffuse moderately and the small mode field diameter of the optical fiber is increased so as to be equal to the large mode field diameter of the other optical fiber. In this splice method, the mode field diameter at the end of both optical fibers substantially coincides. Therefore, the splice loss between the optical fibers is decreased.

However, in this first splice method, before the fusion splice is carried out using an ordinary fusion splicer, special equipment such as a micro-torch is necessary to heat the vicinity of one end of the optical fiber having a small mode field diameter. That is, another apparatus comprising a micro-torch as a heat source is necessary in addition to a fusion splicer. In addition, the problem that the work is complicated arises. Namely, a preliminary treatment using the apparatus must be performed; thereby the fusion splice steps are complicated.

Figure 6:
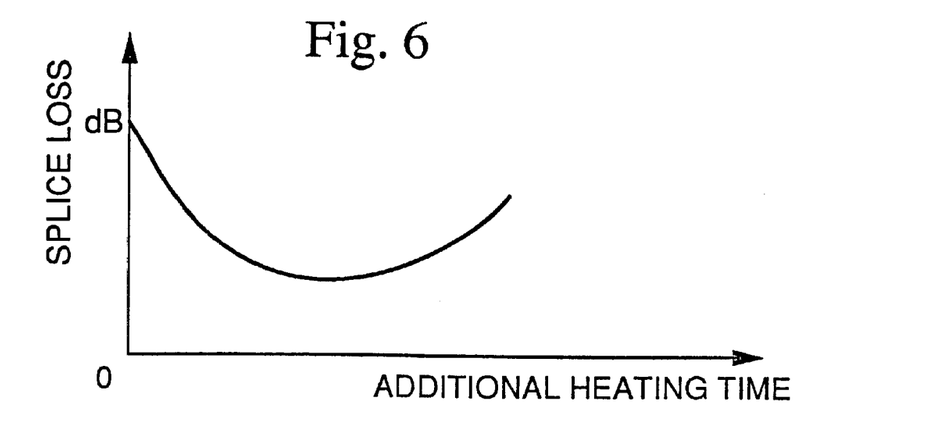
FIG. 6 is a graph showing the relationship between additional heating time and splice loss in the conventional optical fiber fusion splice method.

As the second splice method, a splice method has been used in which two optical fibers are arranged so that the cut surfaces of the two optical fibers face each other, the ends of the optical fibers are fusion spliced by heating using an arc discharge, and then the place which was heated is additionally heated by an arc discharge. This splice method is disclosed in Japanese Patent Application, First Publication No. Hei 05-215931. This splice method is adopted to splice an optical fiber doped with erbium with an ordinary single mode optical fiber having a band of 1.55 µm. In other words, when the thermal diffusion rate of the dopants contained in the core of the optical fiber having a small core diameter is large, the second splice method is adopted. The second splice method utilizes the phenomenon that when the fusion splice portion which is previously formed is heated additionally for a suitable period of time, the difference between the core diameters of two optical fibers decreases. FIG. 6 shows the relationship between the splice loss and the additional heating times when the second splice method is adopted. It is clear from FIG. 6 that the splice loss between two optical fibers can be most decreased by stopping the additional heating after a period of time.

Although, the second splice method does not need the special apparatus which is necessary for the first splice method, it has a problem that a sufficiently low splice loss can be obtained because the additional heating is carried out using an arc discharge. An arc discharge can heat only a narrow area in the longitudinal direction of the optical fiber, and the diffusion area of the core dopants is narrow in the longitudinal direction of the optical fiber. Therefore, it is difficult to decrease gradually the diffusion area of core dopant from the fusion splice portion to the non-fusion splice portion. That is, it is hard to shape the diffusion area of core dopants at the cross-sectional surface in the longitudinal direction of the optical fiber into a taper from the fusion splice portion to the non-fusion splice portion. Therefore, a sufficiently low splice loss cannot be obtained.

Figure 7A:
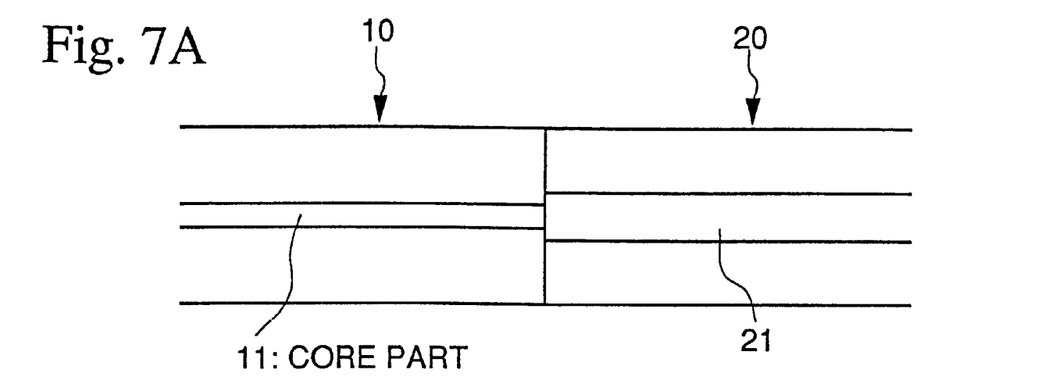
FIGS. 7A and 7B are drawings for explaining one problem of the conventional optical fiber fusion splice method.
Figure 7B:
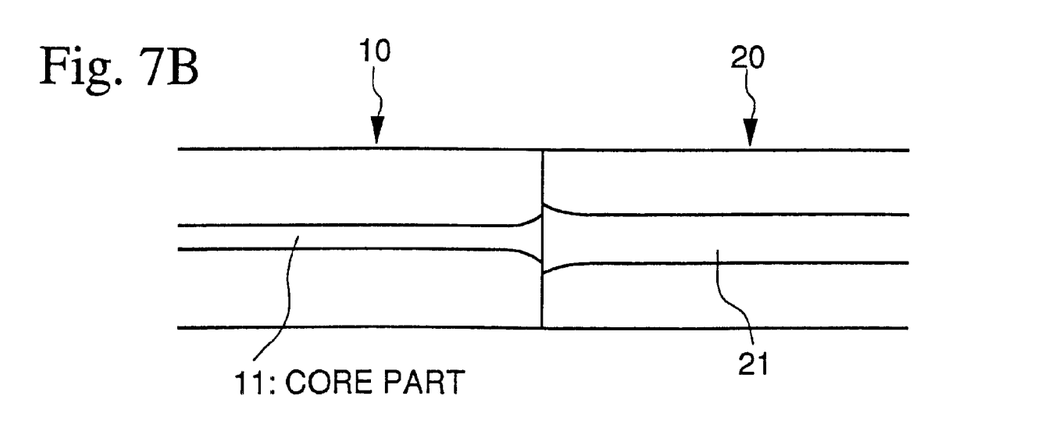

Furthermore, when the thermal diffusion rate of core dopants contained in the optical fiber having a large core diameter is larger than a thermal diffusion rate of core dopants contained in the optical fiber having a small core diameter, and the second splice method is adopted, the difference between the core diameters of the two optical fibers increases. Namely, when the second splice method is adopted in this situation, the undesirable effect that the splice loss increases is sometimes obtained. Specifically, as shown in FIG. 7A, when an optical fiber 10 having a thin core part 11 and an optical fiber 20 having a thick core part 21 are fusion spliced and a vicinity of the fusion splice portion is heated uniformly, not only the core dopants contained in the thin core part 11 but also the core dopants contained in the thick core part 20 diffuse. Then, as shown in FIG. 7B, a situation arises in which the difference of core diameter between the core parts 11 and 21 increases.

Therefore, the object of the present invention is to provide an optical fiber fusion splice method in which two optical fibers having different mode field diameters are fusion spliced with a low splice loss without complicated works and special equipment other than fusion splice device, and an optical fiber fusion splicer which is suitably used for the optical fiber splice method.

SUMMARY OF THE INVENTION

According to a first aspect of the present invention, the present invention provides an optical fiber fusion splice method for splicing two optical fibers having different mode field diameters comprising the steps of:

arranging a first optical fiber having a small mode field diameter and a second optical fiber having a large mode field diameter so that the cut surfaces thereof face each other, heating by an electric discharge and fusion splicing the cut surfaces, shifting the heating position by an electric discharge in the first optical fiber by shifting integrally the first and second optical fibers in the longitudinal direction of the optical fibers, and additional heating the first optical fiber by an electric discharge.

According to the optical fiber fusion splice method, the additional heating by an electric discharge is carried out in the first optical fiber having a small mode field diameter, therefore, only the core dopants contained in the first optical fiber are diffused. In other words, only the mode field diameter of the first optical fiber can be gradually increased.

Thereby, it is possible to correspond the mode field diameter of the first optical fiber to the mode field diameter of the second optical fiber. Furthermore, the cross-sectional shape of the mode field diameter in the longitudinal direction of the first optical fiber is tapered from the fusion splice portion to the non-fusion splice portion. Therefore, it is possible to make the splice loss of the optical fiber smaller than the splice loss of an optical fiber for which the cross-sectional surface of the mode field diameter is short and tapered, namely the splice loss of an optical fiber having a part at which the mode field diameter suddenly increases.

In particular, when the heating by an electric discharge is carried out intermittently at a plurality of positions on the first optical fiber so that the energy due to the heating by an electric discharge per fixed length is decreased in proportion to the distance that the heated position is away from the fusion splice portion, the shape of the mode field diameter of the first optical fiber can be gradually decreased from the fusion splice portion to the non-fusion splice portion. Therefore, the splice loss can be decreased.

Furthermore, when the butted cut surfaces of the first and second optical fibers are heated by an electric discharge, and additional heating is carried out continuously in the first optical fiber so that the energy due to the heating by an electric discharge per fixed length is decreased in proportion to the distance that the heated position is away from the fusion splice portion, the cross-sectional shape of the mode field diameter in the longitudinal direction of the first optical fiber is gradually tapered from the fusion splice portion to the non-fusion splice portion. Therefore, the splice loss can be more decreased.

According to a second aspect of the present invention, the present invention provides an optical fiber fusion splicer comprising a heating source, and first and second moving blocks for clamping two optical fibers and moving the two optical fibers in the longitudinal direction of the optical fibers, wherein said first moving block is mounted on the second moving block.

According to the optical fiber splicer of the present invention, only the first optical fiber clamped with the first moving block can be shifted relative to the second optical fiber clamped with the second moving block by shifting the first moving block on the second moving block. Moreover, when the second moving block is shifted, the first moving block and the second moving block are shifted integrally. Thereby, the two optical fibers positioned by the first and second moving blocks are shifted by exactly the same distance and at exactly the same time. Therefore, pressure is never added to the splice portion of the optical fibers while the two optical fibers are fusion spliced, and a low splice loss can be achieved.

According to a third aspect of the present invention, the present invention provides an optical fiber fusion splicer comprising a heating source, and first and second moving blocks for clamping two optical fibers and moving the two optical fibers in the longitudinal direction of the optical fibers, wherein said first and second moving blocks are mounted on a third moving block.

According to the optical fiber splicer of the present invention, the first and second moving blocks are integrally shifted by shifting the third moving block. Then, the two optical fibers positioned with the first and second moving blocks are shifted by exactly the same distance and at exactly the same time. Therefore, pressure is never added to the splice portion of the optical fibers while the two optical fibers are fusion spliced, and a low splice loss can be achieved.

In other words, it is possible for the two optical fibers during a fusion splice to be shifted easily by exactly the same distance and at exactly the same time. Therefore, when two optical fibers having different mode field diameters are fusion spliced by the optical fiber splice method, the heated area of the optical fiber can be enlarged by using the optical fiber splicer, thereby a fusion splice with a low splice loss can be easily achieved.

DESCRIPTION OF THE PREFERRED EMBODIMENTS

Below, the optical fiber fusion splice method and the optical fiber fusion splicer of the present invention are explained referring to Figures.

First, the details of the optical fiber fusion splice method will be explained below.

EXAMPLE 1

Figure 1A:
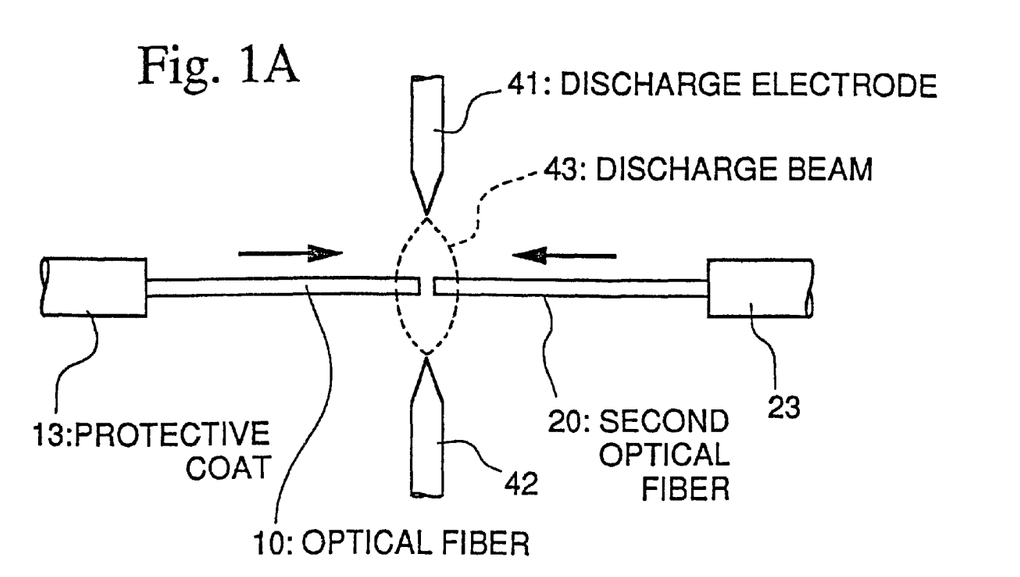
FIGS. 1A and 1B are drawings for explaining the optical fiber fusion splice method according to the present invention.

As shown in FIG. 1A, the ends of the sheath (protective coat) 13 and 23 provided on the first optical fiber having a small mode field diameter and the second optical fiber having a large mode field diameter are peeled. Then, the first and second optical fibers 10 and 20 are arranged so that the cut surfaces of the two optical fibers face each other. An arc discharge is generated between the discharge electrodes 41 and 42 by applying a high voltage to the discharge electrodes 41 and 42, thereby, a discharge beam 43 is generated. The butted ends of the first and second optical fibers 10 and 20 are heated and begin to melt by heat generated due to the discharge beam 43. At this moment, the butted ends of the first and second optical fibers 10 and 20 are fusion spliced by shifting the first and second optical fibers 10 and 20 in the directions indicated by arrows in FIG. 1A, and contacting with pressure both cut surfaces.

Figure 1B:
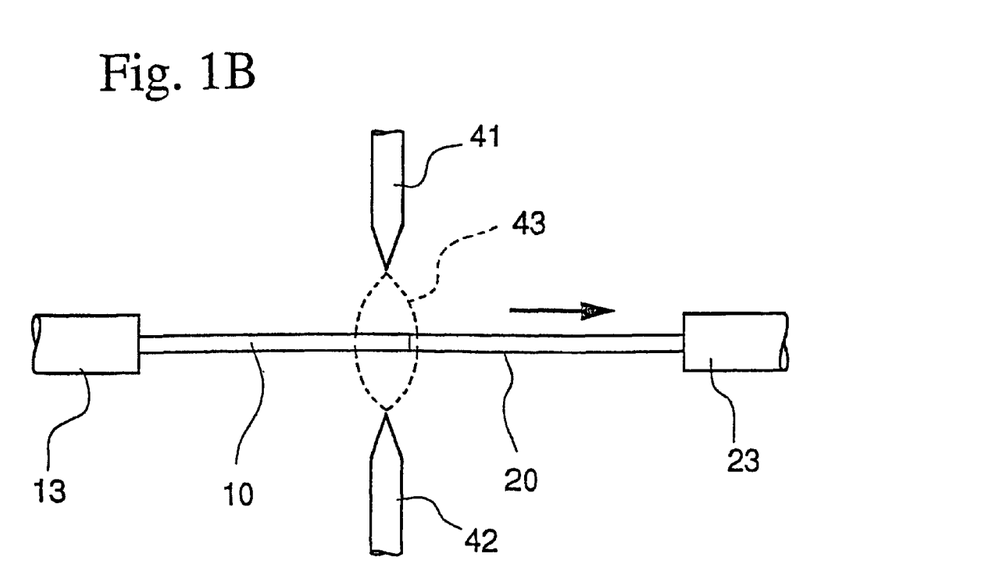

After that, the first and second optical fibers 10 and 20 shift simultaneously to the right side as indicated by an arrow in FIG. 1B, while no pressure is applied to the fusion splice portion. The area heated by the discharge beam 43 shifts from the fusion splice portion to the left side, namely to the first optical fiber 10 having a small mode field diameter. Additional heating is carried out by discharging an arc between the discharge electrodes 41 and 42 maintaining the position of the optical fibers. Thereby, only the core dopants contained in the first optical fiber 10 diffuse, and the mode field diameter of the first optical fiber 10 will correspond to the mode field diameter of the second optical fiber 20. Moreover, the shape of the mode field diameter of the first optical fiber 10 is a taper from the fusion splice portion to the non-fusion splice portion. Therefore, it is possible to make the splice loss of the optical fiber small than the splice loss of an optical fiber for which the cross-sectional surface of the mode field diameter is short and tapered, namely the splice loss of an optical fiber having a part at which the mode field diameter suddenly increases.

Figure 2A:
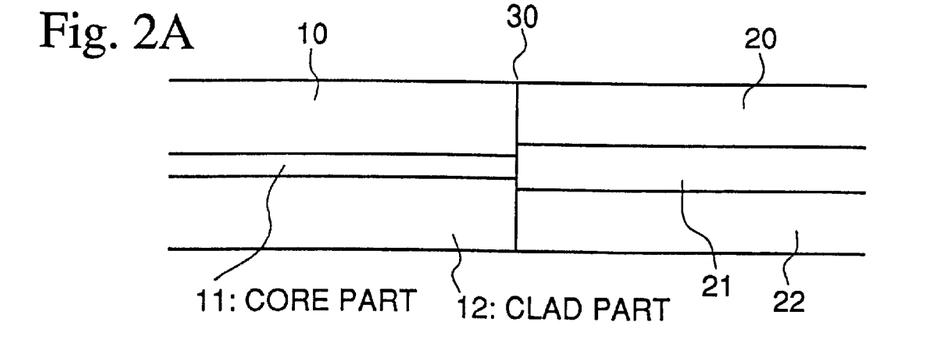
FIGS. 2A to 2D are drawings for explaining other optical fiber fusion splice methods according to the present invention, and are diagrams showing the longitudinal cross-sectional surface near the fusion splice portion.
Figure 2B:
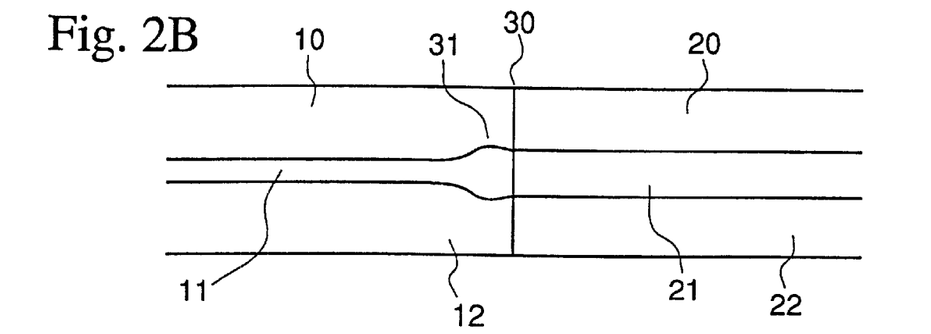

In other words, when the first and second optical fibers 10 and 20 are simply fusion spliced, the first and second optical fibers 10 and 20 are fusion spliced maintaining the difference between the diameters of the core portions 11 and 21, as shown in FIG. 2A. The additional heating is carried out near the position 31, where the first optical fiber 10 is shifted relative to the fusion splice portion 30, as shown in FIG. 2B. The dopants contained at the position 31 in the first optical fiber 10 diffuse to the clad part 12 around the core part 11. Therefore, the diameter of the core part 11 at the position 31 of the first optical fiber 10 increases and substantially corresponds to the diameter of the core part 21 of the second optical fiber 20. Furthermore, the mode field diameter of the first optical fiber 10 in the longitudinal direction thereof gradually decreases, and the shape of the mode field diameter is a taper.

According to the optical fiber fusion splice method, when the first optical fiber 10 having a small mode field diameter and the second optical fiber 20 having a large mode field diameter are spliced, it is possible to increase the mode field diameter near the fusion splice portion 30 of only the first optical fiber 10. In addition, the core dopants contained in the first optical fiber 10 diffuse so as to be tapered from the fusion splice portion 30 to the non-fusion splice portion. Therefore, it is possible to prevent the generation of a difference between the mode field diameters at the fusion splice portion 30 by making the mode field diameter of the first optical fiber 10 correspond to that of the second optical fiber 20. Furthermore, the mode field diameter of the first optical fiber 10 decreases from the fusion splice portion 30 to the non-fusion splice portion so as to be tapered. Therefore, a fusion splice with a low splice loss can be achieved.

In general, when the mode field diameter decreases from the fusion splice portion 30 to the non-fusion splice portion, the more gradually the mode field diameter decreases, the more splice loss can be decreased. For example, when the cross-sectional shape of the mode field diameter in the longitudinal direction is a taper from the fusion splice portion 30 to the non-fusion splice portion, the longer the length of the taper is, the more splice loss can be decreased.

Moreover, when the thermal diffusion rate of the dopants contained in the core part 21 of the second optical fiber 20 is rapid, the additional heating is carried out near the position 31 where the first optical fiber 10 is shifted relative to the fusion splice portion 30; therefore, the second optical fiber 20 is not heated so much. Consequently, the thermal diffusion rate of the dopants contained in the core part 21 of the second optical fiber 20 is insignificant. That is, the mode field diameter of the second optical fiber 20 does not substantially increase. Therefore, the second optical fiber having a large mode field diameter may be any kinds of optical fiber in the optical fiber fusion splice method of this Example. The kinds of the optical fiber used in the optical fiber fusion splice method is not specifically limited.

EXAMPLE 2

Figure 2C:
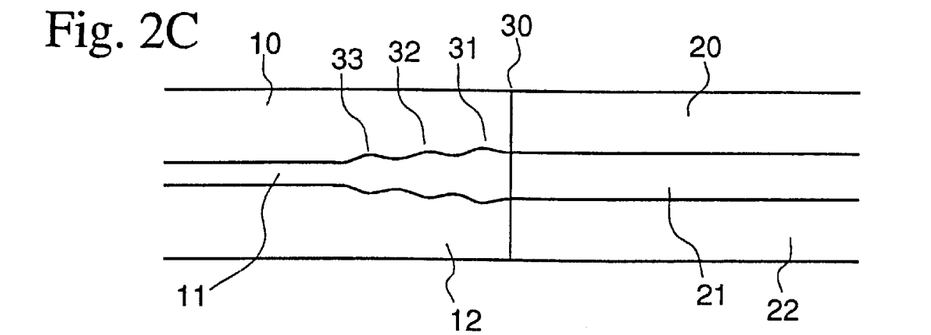

Below, another optical fiber fusion splice method of the present invention is explained. In the present example, the additional heating by an electric discharge is carried out intermittently at a plurality of positions while the additional heating position is shifted little by little. In other words, as shown in FIG. 2A, the first optical fiber 10 having a small mode field diameter and the second optical fiber 20 having a large mode field diameter are fusion spliced by heating due to the arc discharge beam 43 between the discharge electrodes 41 and 42, similar to Example 1. Then, the first and second optical fibers 10 and 20 shift integrally to the right side, and the additional heating is carried out by shifting the discharge beam 43 toward the first optical fiber 10 relative to the fusion splice portion 30. The additional heating is not carried out at one position, but is carried out at a plurality of positions while the additional heating position shifts toward the non-fusion splice portion little by little. Namely, as shown in FIG. 2C, the additional heating is carried out at three positions 31, 32 and 33 in the first optical fiber 10 near the fusion splice portion 30. As a result, the dopants contained in the core part 11 at the three positions 31, 32 and 33 diffuse. The optical fiber fusion splice method of this Example can solve the problem caused by the area heated of the an arc discharge being extremely narrow. In other words, according to the optical fiber fusion splice method of this Example, the mode field diameter of the first optical fiber 10 can be decreased gradually from the fusion splice portion 30 to the non-fusion splice portion by carrying out additional heating at a plurality of positions using an arc discharge which cannot heat a wide area. Therefore, the splice loss can be decreased.

In particular, when the heating energy due to an electric discharge per fixed length is decreased in proportion to the distance of the heating positions 31, 32 and 33 from the fusion splice portion 30, the mode field diameter of the first optical fiber 10 can be gradually decreased from the fusion splice portion 30 to the non-fusion splice portion. Therefore, the splice loss can be further decreased.

EXAMPLE 3

Below, the third optical fiber fusion splice method of the present invention is explained.

Figure 2D:
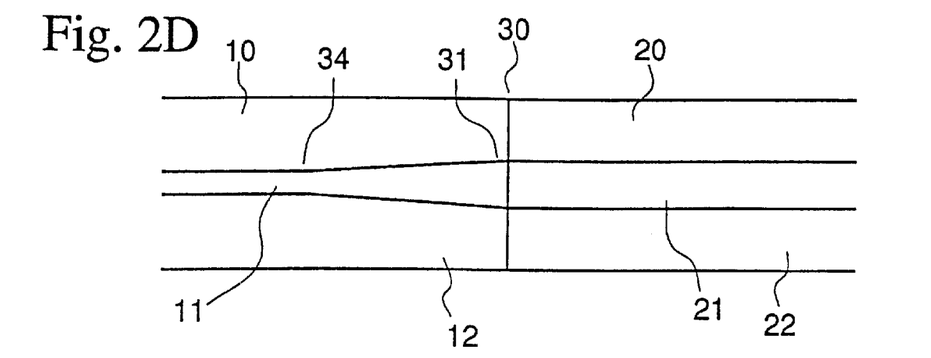

In the Example 2, the additional heating by an electric discharge is carried out intermittently at a plurality of positions; however, in the present Example, the additional heating is carried out continuously at a plurality of positions, and the heating energy due to an electric discharge of the additional heating is gradually decreased, while the additional heating position is shifted little by little. In other words, as shown in FIG. 2A, the first optical fiber 10 having a small mode field diameter and the second optical fiber 20 having a large mode field diameter are fusion spliced by heating due to the arc discharge beam 43 between the discharge electrodes 41 and 42. Then, while the additional heating is carried out continuously, the first and second optical fibers 10 and 20 integrally shift to the right side, thereby the position irradiated by the discharge beam 43 shifts toward the first optical fiber 10 relative to the fusion splice portion 30. While the additional heating is carried out continuously, the heating energy due to an electric discharge of the additional heating per fixed length is gradually decreased in proportion to the distance of the heating position from the fusion splice portion 30. In other words, as shown in FIG. 2D, the additional heating is carried out continuously while the heating energy per fixed length is decreased from the position 31 near the fusion splice portion 30 to the position 34 far from the fusion splice portion 30. Thereby, the thermal diffusion rate of the dopants contained in the core part 11 of the first optical fiber 10 can be gradually decreased, and the mode field diameter of the first optical fiber 10 can be tapered from the fusion splice portion 30 to the non-fusion splice portion. Consequently, the splice loss of the fusion splice portion 30 between the two optical fibers 10 and 20 having different mode field diameters can be further decreased.

Next, the optical fusion splicer which is suitably used for the above optical fiber fusion splice methods will be explained below.

EXAMPLE 4

Figure 3:
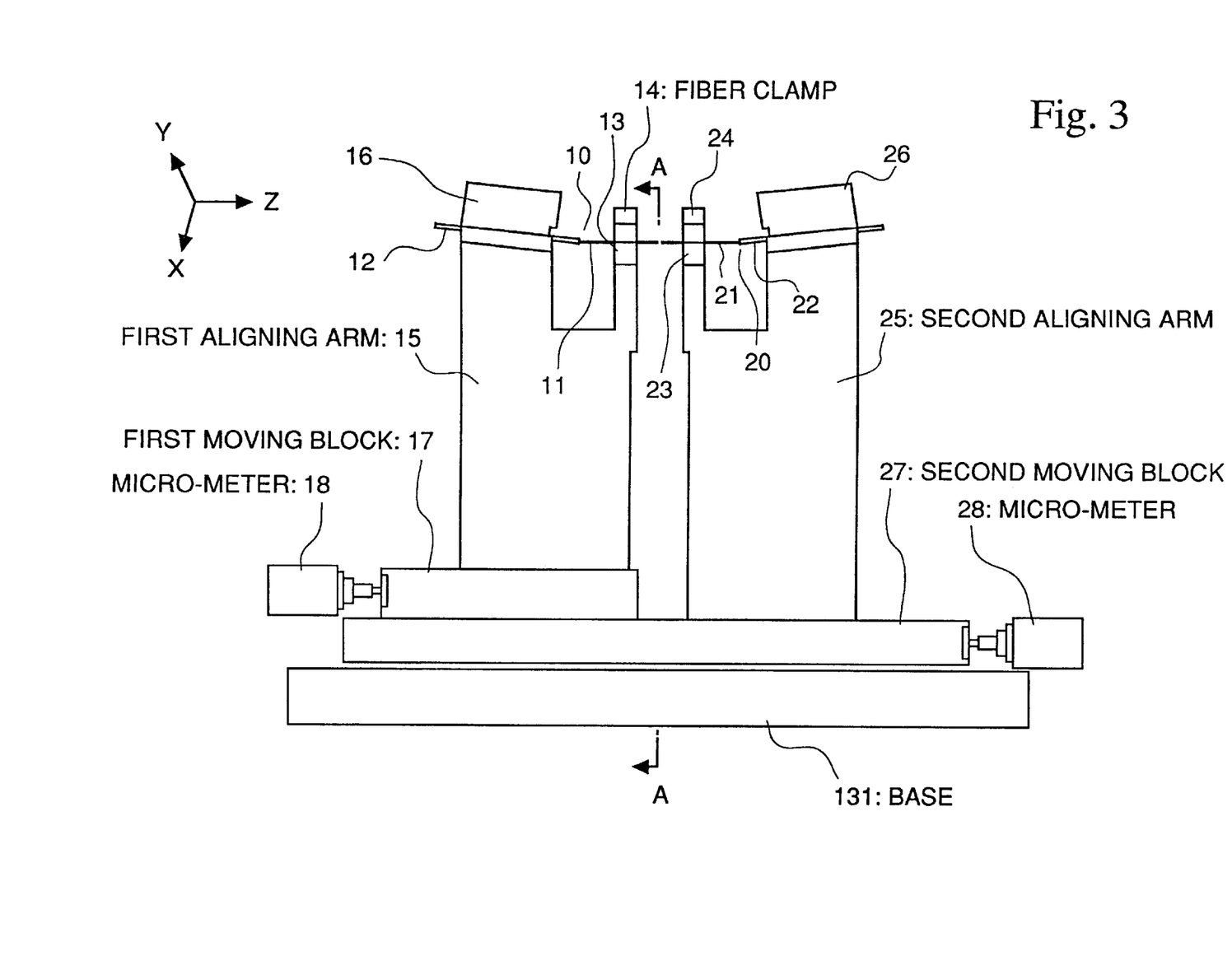
FIG. 3 is a diagram showing the optical fiber fusion splicer according to the present invention.

As shown in FIG. 3, the ends of the sheaths 12 and 22 of the first single-core optical fiber 10 and the second single-core optical fiber 20 to be spliced are peeled, and the core wires 11 and 21 are exposed. Furthermore, the ends of the core wires 11 and 21 are surface treated. The core wires 11 and 21 are positioned in the V-shaped grooves of the V-shaped groove blocks 13 and 23, and fixed by the fiber clamps 14 and 24. The sheaths 12 and 22 are fixed by the sheath clamps 16 and 26. The first and second optical fibers 10 and 20 to be spliced are located and fixed at the top ends of the first aligning arm 15 and the second aligning arm 25. The first aligning arm 15 is fixed on the first moving block 17. The second aligning arm 25 is fixed on the second moving block 27. The first moving block 17 can slide freely on the second moving block 27 in the Z direction in FIG. 3 by using a bearing, etc.. The sliding of the first moving block 17 is controlled by the micro-meter 18.

Figure 4:
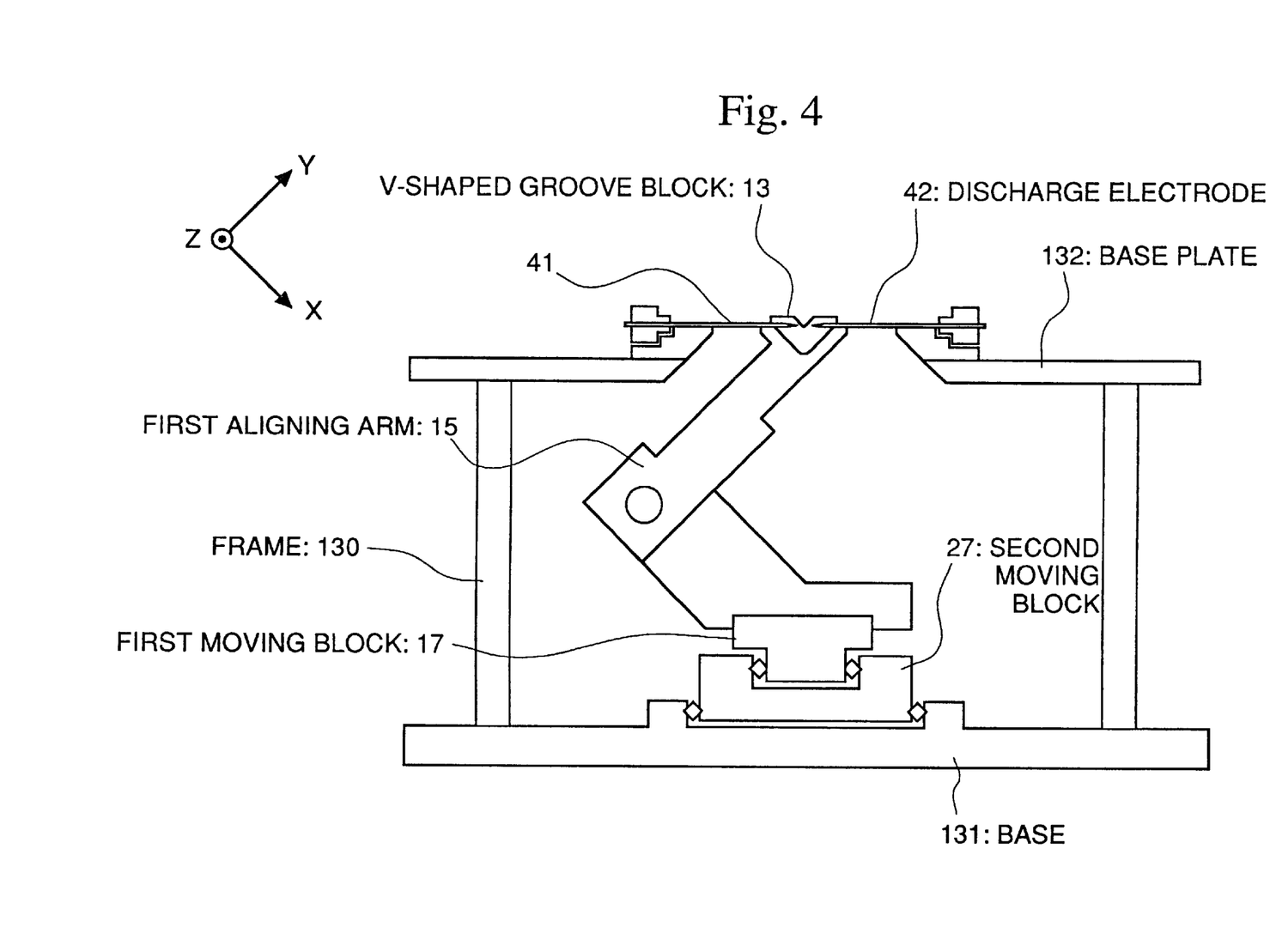
FIG. 4 is a diagram showing the optical fiber fusion splicer when the optical fiber fusion splicer is cut across the line A—A and is viewed from the direction indicated by the arrow in FIG. 3.

The second moving block 27 can slide freely on the base 131 of the frame 130 in the longitudinal direction of the optical fibers (Z direction), as shown in FIG. 4, by using a bearing, etc.. The sliding of the second moving block 27 is controlled by the micro-meter 28.

FIG. 4 is a diagram showing the optical fiber fusion splicer when the optical fiber fusion splicer is cut across the line A—A and is viewed from the direction indicated by the arrow in FIG. 3. As shown in FIG. 4, the V-shaped groove block 13 is fixed into the top end of the first aligning arm 15. The base end of the first aligning arm 15 is mounted on the first moving block 17. Moreover, the sheath clamp 16 is omitted in FIG. 4.

The base plate 132 is mounted on the top of the frame 130. Two discharge electrodes 41 and 42 are arranged on the frame 130 so as to be positional the same distance from the V-shaped groove and to face each other.

FIG. 4 does not indicate the second aligning arm 25. However, the second aligning arm 25 can be comprised similarly to the first aligning arm 15. Moreover, moving apparatuses for aligning the first and second optical fibers 10 and 20 in the X and Y direction in FIG. 4 are omitted, but suitable apparatuses can be used.

In the optical fiber fusion splicer as shown in FIG. 3, the first aligning arm 15 can slide on the second moving block 27 in the Z direction. When the first aligning arm 15 slides in the Z direction, the first optical fiber 10 clamped by the first aligning arm 15 can shift toward or away from the second optical fiber 20 clamped by the second aligning arm 25 in the longitudinal direction of the optical fibers 10 and 20. Moreover, when the second moving block 27 slides in the Z direction, the second aligning arm 25 and the second optical fiber 20 clamped by the second aligning arm 25 certainly shift in the Z direction. Furthermore, the first moving block 17 mounted on the second moving block 27 also shifts integrally with the second moving block 27. Therefore, the first optical fiber 10 clamped by the first aligning arm 15 also shifts at the same time in the Z direction.

Specifically, the first and second aligning arms 15 and 25 shift integrally with the second moving block 27. Therefore, the first and second optical fibers 10 and 20 clamped with the first and second aligning arms 15 and 25 also shift integrally with each other. No tensile force or fitting force is applied to the first and second optical fibers 10 and 20. In other words, the area heated by an electric discharge can shift in the longitudinal direction of the optical fiber without any pressure being applied to the first and second optical fibers 10 and 20 by sliding the second moving block 27 while the first and second optical fibers 10 and 20 are heated by generating an electric discharge between the two discharge electrodes 41 and 42.

According to the optical fiber fusion splicer of this Example, the area heated by an electric discharge can be enlarged. Therefore, the first and second optical fibers 10 and 20 having different mode field diameters are fusion spliced using the optical fiber fusion splicer of this Example, a fusion splice with a small splice loss can be achieved. In addition, according to the optical fiber fusion splicer of this Example, the heated area can be enlarged and shifted by only adjusting the shifting distance of the second moving block 27. Therefore, a fusion splice of any kinds of optical fibers can be easily carried out. Furthermore, the optical fiber fusion splicer of this Example comprises a simple mechanism in which the first moving block 17 slides on the second moving block 27; therefore, maintenance of the optical fiber fusion splicer is easy.

Moreover, the concrete structures, configurations, etc. of the optical fiber fusion splicer of the present invention are not specifically limited to those of the optical fiber fusion splicer of this Example, and can be adjusted.

Figure 5:
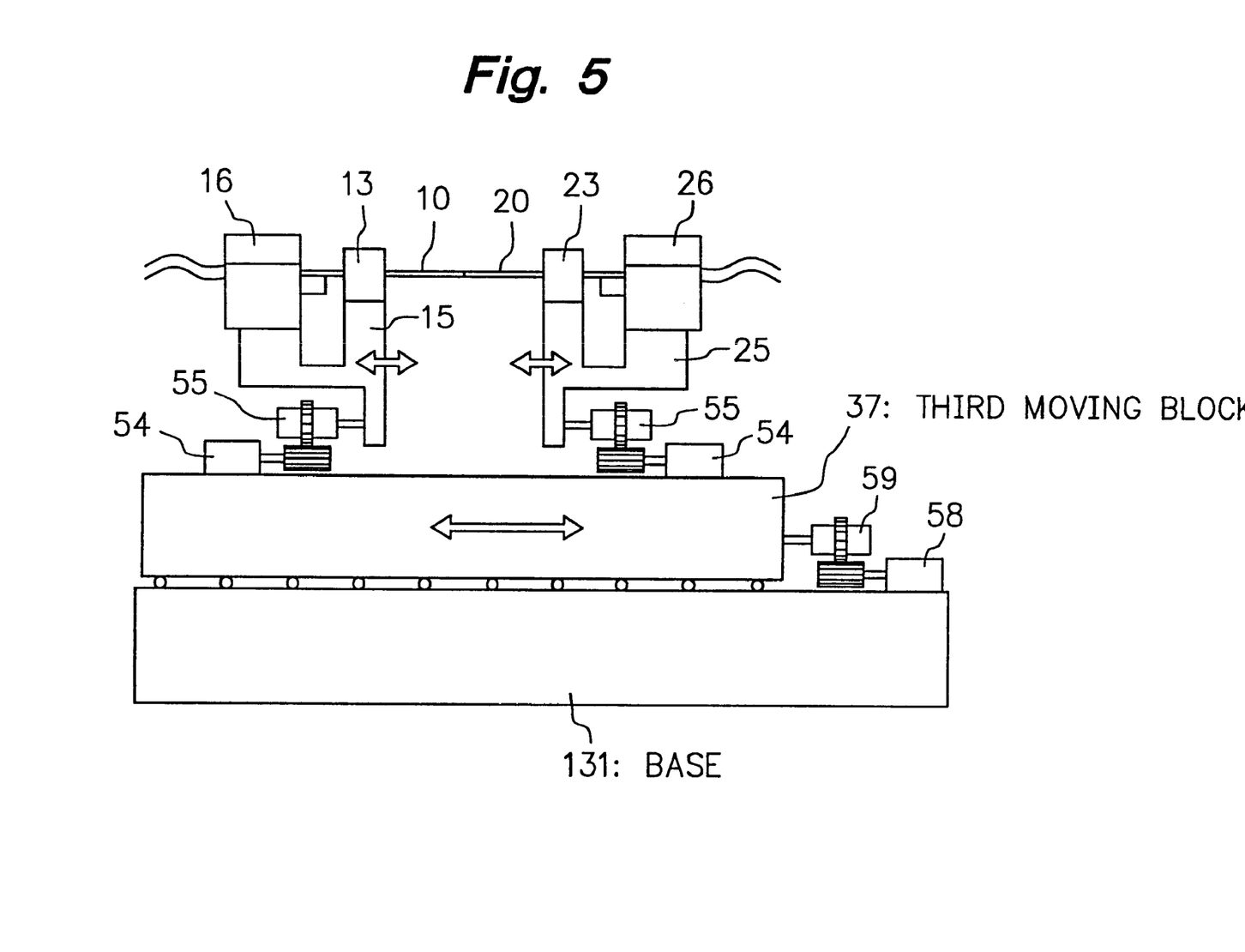
FIG. 5 is a diagram showing other optical fiber fusion splicer according to the present invention.

For example, the optical fiber fusion splicer shown in FIG. 5 can be adopted. When the optical fiber fusion splicer shown in FIG. 5 is used to fusion splice the first and second optical fibers 10 and 20, the first and second optical fibers 10 and 20 are arranged so that the cut surfaces of the two optical fibers 10 and 20 face each other by shifting the first and second aligning arms 15 and 25 each clamping the first and second optical fibers 10 and 20, using the micro-meters 55 and 55 and the motors 54 and 54, and fusion spliced. Then, the third moving block 27 on which the first and second aligning arms 15 and 25 are mounted shifts using the motor 58 and the micro-meter 59. In this way, the first and second optical fibers 10 and 20 can integrally shift using the optical fiber fusion splicer shown in FIG. 5. Therefore, the area heated by an electric discharge can shift in the longitudinal direction of the first and second optical fibers 10 and 20 without any pressure being applied to the first and second optical fibers 10 and 20.

Furthermore, the fiber clamps 14 and 24, the V-shaped groove blocks 13 and 23, and the sheath clamps 16 and 26 are respectively mounted on the first and second aligning arms 15 and 25, and shift integrally in the above Example. However, the fiber clamps 14 and 24, the V-shaped groove blocks 13 and 23, and the first and second aligning arms 15 and 25 are mounted on the base 131. Then, only sheath clamps 16 and 26 may be shifted in the Z direction. In this case, the fiber clamps 14 and 24, the V-shaped groove blocks 13 and 23, and the moving apparatuses for aligning the first and second optical fibers 10 and 20 in the X and Y directions do not shift in the Z direction.

In addition, the optical fiber fusion splicer of the present invention can be used to fusion splice not only a single-core optical fiber, but a multi-core optical fiber. When the optical fiber fusion splicer is used to fusion splice multi-core fibers, the first and second optical fibers 10 and 20 use the same V-shaped groove block, and the moving apparatuses 15 and 25 for aligning the first and second optical fibers 10 and 20 in the X and Y directions are omitted. The optical fiber clamps 14 and 24 and the V-shaped groove block are mounted on the base 131, and to not shift in the Z direction. Only the sheath clamps 16 and 26 shift in the Z direction.

What is claimed is:

1. An optical fiber fusion splice method for splicing two optical fibers having different mode field diameters comprising the steps of:
   arranging a first optical fiber having a small mode field diameter and a second optical fiber having a large mode field diameter so that the cut surfaces thereof face each other,
   heating by an electric discharge and fusion splicing the cut surfaces,
   shifting the heating position by an electric discharge in the first optical fiber by shifting integrally the first and second optical fibers in the longitudinal direction of the optical fibers, and
   additional heating the first optical fiber by an electric discharge.

2. An optical fiber fusion splice method according to claim 1, wherein the additional heating by an electric discharge is carried out intermittently at a plurality of positions on the first optical fiber so that the energy due to the heating by an electric discharge per fixed length is decreased in proportion to the distance of the heated position from the fusion splice portion.

3. An optical fiber fusion splice method according to claim 1, wherein the butted ends of the first optical fiber and the second optical fiber are heated by an electric discharge, and additional heating is carried out continuously from the heating for fusion splice in the first optical fiber so that the energy due to the heating by an electric discharge per fixed length is decreased in proportion to the distance of the heated position from the fusion splice portion.

4. An optical fiber fusion splicer for splicing two optical fibers having different mode field diameters, comprising a heating source, a first moving block on which a first aligning arm for locating and fixing a first optical fiber having a mode field diameter is positioned, and a second moving block on which a second aligning arm for locating and fixing a second optical fiber, which has a mode field diameter differing from a mode field diameter of said first optical fiber, and which is spliced and fusion connected with said first optical fiber, is positioned,
   wherein said first moving block is mounted on the second moving block so as to move in a longitudinal direction of said optical fibers.

5. An optical fiber fusion splicer for splicing two optical fibers having different mode field diameters, comprising a heating source, a first aligning arm for locating and fixing a first optical fiber having a mode field diameter, and a second aligning arm for locating and fixing a second optical fiber which has a mode field diameter differing from a mode field diameter of said first optical fiber, and which is spliced and fusion connected with said first optical fiber,
   wherein said first and second moving block are mounted on a third moving block which move in the longitudinal direction of said optical fibers.

* * * * *